United States Patent Office 3,755,356
Patented Aug. 28, 1973

3,755,356
SUBSTITUTED CROTONIC AMIDE γ-LACTAMS
John B. Siddall, Palo Alto, Calif., assignor to
Zoecon Corporation, Palo Alto, Calif.
No Drawing. Continuation-in-part of abandoned application Ser. No. 860,086, Sept. 22, 1969, which is a continuation-in-part of application Ser. No. 874,678, Nov. 6, 1969, now Patent No. 3,631,080. This application June 14, 1971, Ser. No. 153,074
Int. Cl. C07d 27/08
U.S. Cl. 260—326.5 FL       12 Claims

ABSTRACT OF THE DISCLOSURE

Methods of employing and compositions comprising alkylated lactams for the control of insects.

---

This is a continuation-in-part of U.S. Ser. No. 860,086, filed Sept. 22, 1969, now abandoned, and U.S. Ser. No. 874,678, filed Nov. 6, 1969, now U.S. Pat. No. 3,631,080, the entire disclosures of which are incorporated by reference.

This invention relates to methods and compositions for the control of insects. More particularly, the present invention relates to methods and compositions for the control of insects and novel alkylated lactones of Formula A:

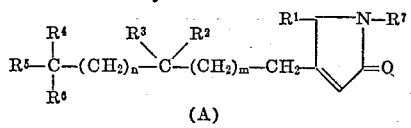

(A)

wherein,
$m$ is zero or the positive integer one to five;
$n$ is the positive integer two to six;
each of $R^1$, $R^2$, $R^6$ and $R^7$ is hydrogen or lower alkyl;
each of $R^3$, $R^4$ and $R^5$ is lower alkyl The term "lower alkyl," as used herein, refers to a saturated aliphatic hydrocarbon group of a chain length of one to six carbon atoms such as methyl, ethyl, n-propyl, n-pentyl, n-hexyl and 2-methylhexyl.

The present invention provides a novel method for the control of insects which comprises treating the insects with an effective amount of a compound of Formula A. To aid in achieving uniform and economical application, it is advantageous to employ a composition comprising an inert carrier and a compound of Formula A. These compositions can be either liquid or solid. The exact formulation employed will vary according to factors such as the specie of insect to be treated, the stage of the insect's life at time of treatment, the degree or extent of insect infestation, environmental conditions and type of application. The most advantageous formulation (composition) for the control of a specific insect is determinable by those of ordinary skill in the art by routine experimentation giving due consideration to the foregoing factors and the description herein.

The formulation employed is also dependent upon the primary mode or mechanism of treating the insects—that is, topical application (absorption), per oral application, per oral application (ingestion), chermosterilant (sterility) or vaporization (inhalation). The primary mode of treating insects is, in turn, dependent on whether the insect is a chewing insect, a sucking insect or flying insect, wherether the control of the insect is sought at the embryo, larvae, pupae or adult stage, and the locus of the insect.

Formulations can be prepared by incorporating a compound of Formula A with a solid inert carrier, such as finely divided talc, silica, pyrophyllite or clay or granular inert carriers, such as vermiculities or a liquid inert carrier, such acetone, xylene, peanut oil, cottonseed oil, sesame oil and other vegetable and mineral oils conventionally employed as carriers in formullations for insect control. Other components can be included such as emulsifying agents, wetting agents and dispersing agents. Generally, the formulation will contain less than 95% by weight of the compound and more frequently less than 25%. Depending upon the particular insect being treated and the particular state of the life cycle at the time of treatment, control of insects by treating the insects with a compound of Formula A is accomplished by the compound's ability to: inhibit metamorphosis; act as a direct insecticide, particularly at the embryo state; act as a chemisterilant; or break the diapause of the insect.

Treatment of insects by vapor action can be accomplished for formulating a compound of Formula A with a resinous material, such as the vinyl polymers, e.g., polyvinyl chloride. This method is particularly useful for flying insects and treating enclosed areas. Suitable formulating methods and carriers are described in U.S. Pat. 3,318,769, for example.

Although not intending to be limited by a theoretical explanation, it appears that the effectiveness of the compounds of Formula A can be traced to their ability to mimic the activity of juvenile hormone substances. Juvenile hormone was identified as methyl 10,11-oxido-7-ethyl-3,11-trimethyltrideca-2,6-dienoate using an extract of cecropia moths by Roeller et al., Angew. Chem. internat. Edit. 6, 179 (1967) and Chemical & Engineering News, 48–49 (Apr. 10, 1967). A second juvenile hormone from the same source has been identified as methyl 10,11-oxido-3,7,11-trimethyltrideca-2,6-dienoate by Meyer et al., "The Two Juvenile Hormones From the Cecropia Silk Moth," Zoology (Proc. N.A.S.) 60 853 (1968). In addition to the natural juvenile hormones, some synthetic terpenoids have been reported exhibiting maturation inhibiting, sterility or ovicidal activity. Bowers et al., Life Sciences (Oxford) 4, 2323 (1965); Bis Science 18, No. 8, 791 (August, 1968); Williams, Scientific American 217, No. 1, 13 (July 1967; Science 154, 248 (Oct. 14, 1966); Romanuk et al., Proc. Nat. Acad. 57, 349 (1967); Masner et al., Nature 219, 395 (July 27, 1968); and U.S. Pats. 3,429,970 and 3,453,362.

Typical insects which can be controlled by treatment with a compound of Formula A in accordance with the present invention as Dysdercus cingulatus, Tenebrio molitor, Galleria mellonella, Tribolium confusm, Periplaneta americana, Hypera puctata (clover leaf weevil), Dysdercus suturellus, Aphididae, such as melon aphid and cabbage aphid, Tinea pellionella, Sitophilus granarius, Lygus hesperus, Schistocerca vaga, Phthorimoea operaculella and Aedes aegypti. Generally, a dosage of about 0.1 to 25 micrograms per insect is employed.

The compounds of Formula A can be prepared according to the following outlined procedures.

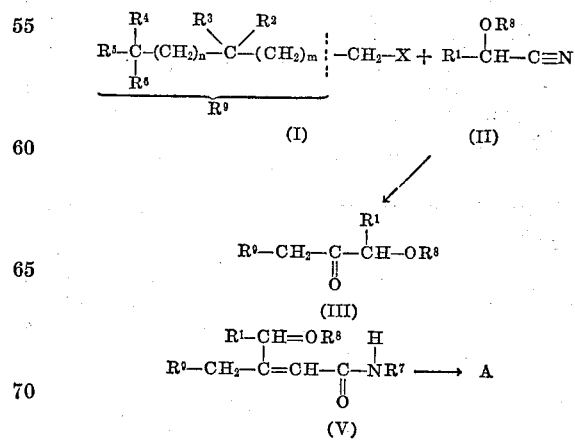

In the above formulas, $R^8$ is an acid labile group such as tetrahydropyran-2-yl or tetrahydrofuran-2-yl, X is bromo or chloro and each of $R^1$, $R^2$, $R^3$, $R^4$, $R^5$, $R^6$, $R^7$, $m$ and $n$ is as defined hereinabove.

In the practice of the above process, the halide I is first converted into the corresponding Grignard in the usual manner by reaction with magnesium in an organic solvent such as ether, tetrahydrofuran, ether/hydrocarbon mixture, hexamethylphosphoramide, and the like and then reacted with the nitrile II in an organic solvent inert to the reaction which can be accomplished by adding the nitrile II to the Grignard of I to yield the ketone III. The reaction can be carried out at room temperature or higher such as at reflux. The ketone III is then reacted with a phosphonamide V' in the presence of base such as an alkali metal hydride to yield IV.

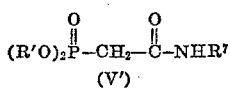

(V')

in which R' is lower alkyl and $R^7$ is as defined hereinabove.

The amide IV is treated with aqueous acid such as dilute aqueous hydrochloric acid, sulfuric acid and the like to remove the acid labile group $R^8$ and then cyclized by treatment with p-toluenesulfonylchloride in pyridine and the like to yield a lactam of Formula A.

The halides of Formula I in which $R^6$ is lower alkyl are prepared according to the procedures described in my copending application Ser. No. 854,778, filed Sept. 2, 1969, now U.S. 3,649,590, the disclosure of which is hereby incorporated by reference.

The nitriles of Formula II are prepared by the reaction of an aldehyde $R^1$—CHO with sodium cyanide in the presence of aqueous acid to yield $R^1$—CHOH—C≡N which is etherified in the usual manner to yield II.

The following examples set forth procedures for the preparation of the compounds of this invention and illustrate the present invention. Temperature in degree centigrade.

EXAMPLE 1

2 g. of 1-bromo-4-ethyl-4,4,7-trimethyloctane is added to 3 g. of magnesium in 25 ml. of ether. After the initial reaction, a solution of 24 g. of 1-bromo-4-ethyl-4,7,7-trimethyloctane in 100 ml. of ether is added while maintaining reflux.

The above prepared Grignard reagent is cooled in an ice bath and 13 g. of 2-(tetrahydropyran-2'-yloxy)-propionitrile is added slowly, under nitrogen, while maintaining reflux. The solution is then refluxed for one hour after completion of the addition, cooled, and a small amount of dilute aqueous sulfuric acid is added with swirling. The mixture is washed with water and the aqueous phase extracted with ether. The organic materials and ether extract are combined and washed with dilute aqueous hydrochloric acid until the washings are just acidic. The organic phase is dried over magnesium sulfate and evaporated under reduced pressure to give 2-(tetrahydropyran - 2'-yloxy)-7-ethyl-7,10,10-trimethylundecan-3-one which can be purified by distillation or chromotography.

EXAMPLE 2

(A) To 2.4 g. of sodium hydride in 100 ml. of tetrahydrofuran, under nitrogen, is added slowly, diethoxyphosphonoacetamide (20 g.) in 100 ml. of tetrahydrofuran. After addition, the mixture is stirred for one hour at room temperature, then 30 g. of 2-(tetrahydropyran-2'-yloxy)-7-ethyl-7,10,10-trimethylundecan-3-one in tetrahydrofuran is slowly added, under nitrogen. After addition is complete, the mixture is poured into water and extracted with methylene chloride. The extracts are washed with water, dried over magnesium sulfate and evaporated to yield 3-[1-(1-tetrahydropyran-2'-yloxy)ethyl]-7-ethyl-7,10,10-trimethylundec-2-enamide which can be purified by chromatography or distillation.

(B) A mixture of 5 g. of the amide of Part A, 50 ml. of dioxane and a small amount of aqueous hydrochloric acid is stirred at room temperature for 6 hours. The mixture is then poured into water and extracted with ether. The ethereal extracts are washed, dried over magnesium sulfate and the solvent evaporated. A mixture of the residue, 3.4 g. of p-toluenesulfonyl chloride, 2 ml. of pyridine and 50 ml. of benzene is stirred at 0° for 2 hours. Then 480 mg. of sodium hydride suspended in 5 ml. of dimethylformamide is added and the mixture stirred at room temperature for 15 hours. The mixture, diluted with 50 ml. of benzene is washed successively with water, dilute hydrochloric acid, water and dried over magnesium sulfate. Evaporation of the solvent and fractional high vacuum distillation of the residue affords 4-hydroxy-4-methyl-3-(4'-ethyl-4',7',7'-trimethyloctan-1'-yl) crotonic amide γ-lactam.

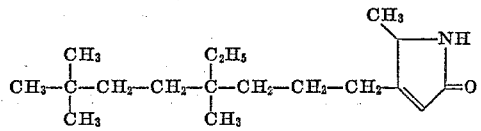

EXAMPLE 3

(A) The procedure of Example 1 is repeated using each of 1-bromo-4,4,8,8,-tetramethylnonane,
1-bromo-3,3,7,7-tetramethyloctane,
1-bromo-4,4,7,7-tetramethyloctane,
1-bromo-4,4,8,8-tetramethyldecane,
1-bromo-4,7,7-trimethyl-4-ethylnonane,
1-bromo-4,7-dimethyl-4,7-diethylnonane,
1-bromo-4,4,7,7-tetramethylnonane, and
1-bromo-4,4,9,9-tetramethyldecane as the starting material in place of 1-bromo-4-ethyl-4,7,7-trimethylocatane to yield the respective product listed under Column I.

I 2-(tetrahydropyran-2'-yloxy)-7,7,11,11-tetramethyl-dodecan-3-one
2-(tetrahydropyran-2'-yloxy)-6,6,10,10-tetramethyl-undecan-3-one
2-(tetrahydropyran-2'-yloxy)-7,7,10,10-tetramethyl-undecan-2-one
2-(tetrahydropyran-2'-yloxy)-7,7,11,11-tetramethyl-tridecan-3-one
2-(tetrahydropyran-2'-yloxy)-7-ethyl-7,10,10-trimethyl-dodecan-3-one
2-(tetrahydropyran-2'-yloxy)-7,10-diethyl-7,10-di-methyldodecan-3-one
2-(tetrahydropyran-2'-yloxy)-7,7,10,10-tetramethyl-dodecan-3-one
2-(tetrahydropyran-2'-yloxy)-7,7,12,12-tetramethyl-tridecan-3-one

EXAMPLE 4

(A) The process of Example 2 (Part A) is repeated using each of the ketones listed under Column I to yield the respective product listed under Column II.

(II)

3-[1-(1-tetrahydropyran-2'-yloxy)ethyl]-7,7,11,11-tetramethyldodec-2-enamide
3-[1-(1-tetrahydropyran-2'-yloxy)ethyl]-6,6,10,10-tetramethylundec-2-enamide
3-[1-(1-tetrahydropyran-2'-yloxy)ethyl]-7,7,10,10-tetramethylundec-2-enamide
3-[1-(1-tetrahydropyran-2'-yloxy)ethyl]-7,7,11,11-tetramethyltridec-2-enamide
3-[1-(1-tetrahydropyran-2'-yloxy)ethyl]-7-ethyl-7,10,10-trimethyldodec-2-enamide 3-[1-(1-tetrahydropyran-2'-yloxy)ethyl]-7,10-diethyl-
  7,10-dimethyldodec-2-enamide
3-[1-(1-tetrahydropyran-2'-xyloxy)ethyl]-7,7,10,10-
  tetramethyldodec-2-enamide
3-[1-(1-tetrahydropyran-2'-yloxy)ethyl]7,7,12,12-
  tetramethyltridec-2-enamide (B) Each of the amides under Column II is used in the process of Example 2 (Part B) to prepare the respective final product listed under Column III.

(III)

4-hydroxy-4-methyl-3-(4',4',8',8'-tetramethylnonan-
  1'-yl)crotonic amide γ-lactam
4-hydroxy-4-methyl-3-(3',3',7',7'-tetramethyloctan-
  1'-yl)crotonic amide γ-lactam
4-hydroxy-4-methyl-3-(4',4',7',7'-tetramethyloctan-
  1'-yl)crotonic amide γ-lactam
4-hydroxy-4-methyl-3-(4',4',8',8'-tetramethyldecan-
  1'-yl)crotonic amide γ-lactam
4-hydroxy-4-methyl-3-(4'-ethyl-4',7',7'-trimethylnonan-
  1'-yl)crotonic amide γ-lactam
4-hydroxy-4-methyl-3-(4',7'-diethyl-4',7'-dimethylnonan-
  1'-yl)crotonic amide γ-lactam
4-hydroxy-4-methyl-3-(4',4',7',7'-tetramethylnonan-
  1'-yl)crotonic amide γ-lactam
4-hydroxy-4-methyl-3-(4',4',9',9'-tetramethyldecan-
  1'-yl)crotonic amide γ-lactam

EXAMPLE 5

(A) By repeating the process of Example 1 using the halides listed under Column IV, the respective ketones listed under Column V are obtained.

(IV)

1-bromo-5,5,10,10-tetramethylundecane
1-bromo-4,7,7-trimethyloctane
1-bromo-4,8,8-trimethylnonane
1-bromo-4,7,7-trimethylnonane
1-bromo-4-ethyl-7,7-dimethylnonane
1-bromo-4,8,8-trimethyldecane
1-bromo-2,6,6-trimethylheptane (V)

2-(tetrahydropyran-2'-yloxy)-8,8,13,13-tetramethyl-
  tetradecan-3-one
2-(tetrahydropyran-2'-yloxy)-7,10,10-trimethyl-
  undecan-3-one
2-(tetrahydropyran-2'-yloxy)-7,11,11-trimethyl-
  dodecan-3-one
2-(tetrahydropyran-2'-yloxy)-7,10,10-trimethyl-
  dodecan-3-one
2-(tetrahydropyran-2'-yloxy)-7-ethyl-10,10-dimethyl-
  dodecan-3-one
2-(tetrahydropyran-2'-yloxy)-7,11,11-trimethyl-
  tridecan-3-one
2-(tetrahydropyran-2'-yloxy)-5,9,9-trimethyl-
  decan-3-one (B) Each of the ketones under Column V are treated according to the process of Example 2 (Part A) to yield the amides under Column VI which are cyclized using the process of Example 2 (Part B) to yield the lactams under Column VII.

(VI)

3-[1-(1-tetrahydropyran-2'-yloxy)ethyl]-8,8,13,13-
  tetramethyltetradec-2-enamide
3-[1-(1-tetrahydropyran-2'-yloxy)ethyl]-7,10,10-
  trimethylundec-2-enamide
3-[1-(1-tetrahydropyran-2'-yloxy)ethyl]-7,11,11-
  trimethyldodec-2-enamide
3-[1-(1-tetrahydropyran-2'-yloxy)ethyl]-7,10,10-
  trimethyldodec-2-enamide
3-[1-(1-tetrahydropyran-2'-yloxy)ethyl]-7-ethyl-
  10,10-dimethyldodec-2-enamide
3-[1-(1-tetrahydropyran-2'-yloxy)ethyl]-7,11,11-
  trimethyltridec-2-enamide
3-[1-(1-tetrahydropyran-2'-yloxy)ethyl]-5,9,9-
  trimethyldec-2-enamide (VII)

4-hydroxy-4-methyl-3-(5',5',10',10-tetramethylundecan-
  1'-yl)crotonic amide γ-lactam
4-hydroxy-4-methyl-3-(4',7',7'-trimethyloctan-
  1'-yl)crotonic amide γ-lactam
4-hydroxy-4-methyl-3-(4',8',8'-trimethylnonan-
  1'-yl)crotonic amide γ-lactam
4-hydroxy-4-methyl-3-(4,7',7'-trimethylnonan-
  1'-yl)crotonic amide γ-lactam
4-hydroxy-4-methyl-3-(4'-ethyl-7',7'-dimethylnonan-
  1'-yl)crotonic amide γ-lactam
4-hydroxy-4-methyl-3-(4',8',8'-trimethyldecan-
  1'-yl)crotonic amide γ-lactam
4-hydroxy-4-methyl-3-(2',6',6'-trimethylheptan-
  1'-yl)crotonic amide γ-lactam

EXAMPLE 6

Using the process of Example 1, 2-(tetrahydropyran-2'-yloxy)-n-butyronitrile is reacted with Grignard of 1-bromo - 4,4,8,8, - tetramethylnonane to yield 3-(tetrahydropyran - 2' - yloxy) - 8,8,12,12 - tetramethyltridecan-4-one which is converted into 3 - 1 - (1-tetrahydropyran-2' - yloxy)n-propyl - 7,7,11,11 - tetramethyldocec - 2-enamide using the process of Example 2 (Part A) which is converted into 4-hydroxy - 4 - ethyl - 3 - (4',4',8',8'-tetramethylnonan-1'-yl) crotonic acide γ-lactam by the process of Example 2 (Part B.).

By repeating the procedure of this example using 2-(tetrahydropyran - 2' - yloxy) acetonitrile in place of the butyronitrile, there is obtained, as the final product, 4-hydroxy - 3 - (4',4',8',8'-tetramethylnonal - 1' - yl) crotonic amide γ-lactam.

EXAMPLE 7

The procedure of Example 2 (Par. A) is repeated with the exception of using each of N-methyl diethoxyphosphonoacetamide and N-ethyl diethoxyphosphoacetamide in place of diethoxyphosphoacetamide to yield N-methyl 3-[1-(1-tetrahydropyran-2'-yloxy)ethyl] - 7 - ethyl-7,10,10-trimethylundec-2-enamide and N-ethyl 3[1-(1-tetrahydropyran-2'-yloxy) - 1 - 7 - ethyl - 7,10,10-trimethylundec-2-enamide. The thus-obtained N-methyl acid and N-ethyl amide are cyclized using the process of Example 2 (Part B) to afford N-methyl 4-hydroxy - 4-methyl-3-(4'-ethyl-4',7',7' - trimethyloctan-1'-yl) crotonic amide γ-lactam (A; $m$ is 2, $n$ is 2, $R^7$ is $CH_3$, $R^1=R^2=R^4=R^5=R^6=CH_3$, $R^3$ is $CH_2CH_3$) and N-ethyl 4-hydroxy-4-methyl-3-(4'-ethyl-4',7',7'-trimethyloctan-1'-yl) crotonic amide γ-lactam (A; $m$ is 2, $n$ is 2, $R^7$ is $CH_2$—$CH_3$, $$R^1=R^2=R^4=R^5=R^6=CH_3,$$

$R^3$ is $CH_2CH_3$).

Similarly, other ketones of Formula III such as those listed under Columns I and V can be reacted with phosphonoacetamides such as N-methyldiethoxy-phosphonoacetamide and N-ethyl diethoxyphosphonoacetamide to obtain the corresponding 2-enamide of Formula V which is then cyclized according to the process of Example 2 (Part B) to afford the corresponding γ-lactam of formula A.

EXAMPLE 8

N-methyl diethoxyphosphonoacetamide, N-ethyl diethoxy phosphonoacetamide and N-(n-propyl) diethoxyphosphonoacetamide is reacted with 3-(tetrahydropyran-2'-yloxy)-8,8,12,12-tetramethyltridecan - 4 - one using the process of Example 2 (Part A) to yield N-methyl 3-[1-(1-tetrahydropyran-2'-yloxy)n-propyl]-
  7,7,11,11-tetramethyldodec-2-enamide, N-ethyl 3-[1-(1-tetrahydropyran-2'-yloxy) n-propyl]-7,7,11,11-tetramethyldodec-2-enamide and
N-(n-propyl) 3-[1-(1-tetrohydropyran-2'-yloxy) n-propyl]-7,7,11,11-tetramethyldodec-2-enamide, respectively.

Each of the thus obtained amides is cyclized using the process of Example 2 (Part B) to yield the corresponding lactam, that is, N-methyl 4 - hydroxy - 4- ethyl-3-(4',4',8',8' - tetramethylnonan - 1' - yl) crotonic amide γ-lactam, N-ethyl 4 - hydroxy - 4-ethyl-3-(4',4',8',8'-tetramethylnonan-1'-yl) crotonic acide γ-lactam and N-(n-propyl) 4-hydroxy-4-ethyl-3-(4',4',8',8'-tetramethylnonan-1'-yl) crotonic amide γ-lactam, respectively.

EXAMPLE 9

Compositions according to the present invention which are suitable for spraying on the locus of the insects, preferably during egg or larvae stage, or on granular inert carriers are as follows. Parts by weight.

| | Parts |
|---|---|
| 4-hydroxy 4 - methyl - 3-(4'-ethyl-4',7',7'-trimethyl-octan-1'-yl)crotonic amide γ-lactam | 5 |
| Cottonseed oil | 95 |
| 4-hydroxy - 3 - (4',4',8',8' - tetramethylnonan-1'-yl) crotonic amide γ-lactam | 3 |
| Sesame oil | 97 |
| N-ethyl 4 - hydroxy-4-ethyl-3-(4',4',8',8'-tetramethyl-nonan-1'-yl) crotonic amide γ-lactam | 5 |
| Xylene | 95 |

EXAMPLE 10

A mixture of 45 g. of sodium cyanide, 110 ml. of water and 80 g. of n-butyraldehyde is stirred vigorously at 10-20° while 200 ml. of 40% sulfuric acid is added over 3 hours maintaining temperature of 10-20°. After addition is complete, the mixture is stirrred for 15 min., allowed to stand and organic layer decanted off. Aqueous layer is extracted with ether and ether extracts combined with organic layer decanted. Solvent is evaporated to yield 2-hydroxy-n-butyronitrile which is purified by distillation under reduced pressure.

A mixture of 8.5 g. of 2-hydroxy-n-butyronitrile and 8.4 g. of freshly distilled dihydropyran is stirred in the presence of a trace of hydrogen chloride for about four hours, the process of the reaction being followed by thin layer chromatography. Upon completion of the reaction, the mixture is distilled under reduced pressure in the presence of anhydrous potassium carbonate to yield 2-(tetrahydropyran-2'-yloxy)-n-butyronitrile.

By the foregoing procedure, other aldehydes of the formula $R^1$—CHO can be converted into the nitriles of Formula II. Similarly, through the use of dihydrofuran in place of dihydropyran in the above procedure, the corresponding tetrahydrofuran-2'-yl ethers are prepared.

EXAMPLE 11

By repeating the procedure of Example 1 using the halides under Column VIII, the respective ketones listed under Column IX are prepared.

(VIII)

3,6-dimethylheptyl bromide
4,7-dimethyloctyl bromide
2,5-dimethylhexyl bromide
3,7-dimethyloctyl bromide
3,7-dimethylnonyl bromide
4,8-dimethylnonyl bromide
3-methyl-7-ethylnonyl bromide (IX)

2-(tetrahydropyran-2'-yloxy)-6,9-dimethyldecan-3-one
2-(tetrahydropyran-2'-yloxy)-7,10-dimethylundecan-3-one
2-(tetrahydropyran-2'-yloxy)-5,8-dimethylnonan-3-one
2-(tetrahydropyran-2'-yloxy)-6,10-dimethylundecan-3-one
2-(tetrahydropyran-2'-yloxy)-6,10-dimethyldodecan-3-one
2-(tetrahydropyran-2'-yloxy)-7,11-dimethyldodecan-3-one
2-(tetrahydropyran-2'-yloxy)-6-methyl-10-ethyldodecan-3-one The ketones listed under Column IX are treated according to the procedure of Example 2 (A) to prepare the respective amides under Column X which are cyclized using the procedure of Example 2 (B) to prepare the respective lactams under Column XI.

(X)

3-[1-(1-tetrahydropyran-2'-yloxy)ethyl]-6,9-dimethyldec-2-enamide
3-[1-(1-tetrahydropyran-2'-yloxy)ethyl]-7,10-dimethylundec-2-enamide
3-[1-(1-tetrahydropyran-2'-yloxy)ethyl]-5,8-dimethylnon-2-enamide
3-[1-(1-tetrahydropyran-2'-yloxy)ethyl]-6,10-dimethylundec-2-enamide
3-[1-(1-tetrahydropyran-2'-yloxy)ethyl]-6,10-dimethyldodec-2-enamide
3-[1-(1-tetrahydropyran-2'-yloxy)ethyl]-7,11-dimethyldodec-2-enamide
3-[1-(1-tetrahydropyran-2'-yloxy)ethyl]-6-methyl-10-ethyldodec-2-enamide

XI 4-hydroxy-4-methyl-3-(3',6'-dimethylheptane-1'-yl) crotonic amide γ-lactam
4-hydroxy-4-methyl-3-(4',7'-dimethyloctan-1'-yl) crotonic amide γ-lactam
4-hydroxy-4-methyl-3-(2',5'-dimethylhexan-1'-yl) crotonic amide γ-lactam
4-hydroxy-4-methyl-3-(3',7'-dimethyloctan-1'-yl) crotonic amide γ-lactam
4-hydroxy-4-methyl-3-(3',7'-dimethylnonane-1'-yl) crotonic amide γ-lactam
4-hydroxy-4-methyl-3-(4',8'-dimethylnonan-1'-yl) crotonic amide γ-lactam
4-hydroxy-4-methyl-3-(3'-methyl-7'-ethylnonan-1'-yl) crotonic amide γ-lactam The procedure of Example 1 and 2 is repeated with the exception of using 2-(tetrahydropyran-2'-yloxy)acetonitrile and 3,7-dimethyloctyl bromide to prepare as the final product, 4-hydroxy-3-(3',7'-dimethyloctan-1'-yl)crotonic amide γ-lactam.

EXAMPLE 12

Following the procedure of Example 2, each of the ketones under Columns IX is reacted with a phosphonoamide (V') in which R' is ethyl and $R^7$ is methyl and ethyl to prepare an amide of Formula IV in which $R^7$ is methyl and ethyl. For example, the use of N-ethyl diethoxyphosphonoacetamide in place of diethoxyphosphonoacetamide affords the amides under Column XII.

XII

N-ethyl 3-[1-(1-tetrahydropyran-2'-yloxy)ethyl]-6,9-dimethyldec-2-enamide
N-ethyl 3-[1-(1-tetrahydropyran-2'-yloxy)ethyl]-7,10-dimethylundec-2-enamide
N-ethyl 3-[1-(1-tetrahydropyran-2'-yloxy)ethyl]-5,8-dimethylnon-2-enamide
N-ethyl 3-[1-(1-tetrahydropyran-2'-yloxy)ethyl]-6,10-dimethylundec-2-enamide
N-ethyl 3-[1-(1-tetrahydropyran-2'-yloxy)ethyl]-6,10-dimethyldodec-2-enamide
N-ethyl 3-[1-(1-tetrahydropyran-2'-yloxy)ethyl]-7,11-dimethyldodec-2-enamide
N-ethyl 3-[1-(1-tetrahydropyran-2'-yloxy)ethyl]-6-methyl-10-ethyldodec-2-enamide The use of the procedure of Example 2 (B), the foregoing N-ethyl amides are cyclized to prepare the respective N-ethyl lactams.

EXAMPLE 13

A solution of 0.1 mole of N-ethyl 3-[1-(1-tetrahydropyran-2'-yloxy)ethyl]-6,10 - dimethylundec - 2 - enamide in 100 ml. of aqueous tetrahydrofuran (1:4) is treated with aqueous 1 N hydrochloric acid (5 ml.) at 20° for three hours. After addition of aqueous potassium bicarbonate solution (0.5 g. in 300 ml. of water), the mixture is extracted with methylene chloride (3 x 100 ml.). The combined extracts are washed with water (300 ml.), saturated aqueous potassium bicarbonate (50 ml.) and saturated brine (100 ml.), dried over magnesium sulfate and evaporated under reduced pressure to yield N-ethyl 3-[1-(1-hydroxy)ethyl]-6,10-dimethylundec-2-enamide.

By use of the foregoing procedure, other compounds of Formula IV above are hydrolyzed to the respective free hydroxy compound ($R^8$ is hydrogen).

Compounds of the Formula B below, which are prepared using the procedures herein, are useful for the control of insects as described above for compounds of Formula A as well as their utility as intermediates (when $R^1$ is hydrogen) for preparing the lactams of Formula A.

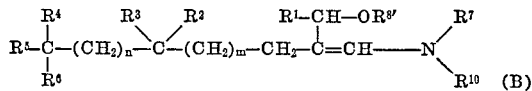
(B)

wherein, each of $m$, $n$, $R^1$, $R^2$, $R^3$, $R^4$, $R^5$, $R^6$ and $R^7$ is as defined above; $R^{8'}$ is hydrogen, tetrahydropyran-2'-yl or tetrahydrofuran-2'-yl; and $R^{10}$ is hydrogen or lower alkyl.

EXAMPLE 14

Following the procedure of Example 2, the anion of N,N-diethyl diethoxyphosphonoacetamide is reacted with the ketones of Column IX to prepare the respective N,N-diethyl amides under Column XIII.

N,N-diethyl 3-[1-(1-tetrahydropyran-2'-yloxy)ethyl]-6,9-dimethyldec-2-enamide
N,N-diethyl 3-[1-(1-tetrahydropyran-2'-yloxy)ethyl]-7,10-dimethylundec-2-enamide
N,N-diethyl 3-[1-(1-tetrahydropyran-2'-yloxy)ethyl]-5,8-dimethylnon-2-enamide
N,N-diethyl 3-[1-(1-tetrahydropyran-2'-yloxy)ethyl]-6,10-dimethylundec-2-enamide
N,N-diethyl 3-[1-(1-tetrahydropyran-2'-yloxy)ethyl]-6,10-dimethyldodec-2-enamide
N,N-diethyl 3-[1-(1-tetrahydropyran-2'-yloxy)ethyl]-7,11-dimethyldodec-2-enamide
N,N-diethyl 3-[1-(1-tetrahydropyran-2'-yloxy)ethyl]-6-methyl-10-ethyldodec-2-enamide Similarly, using N,N-dimethyl diethoxyphosphonoacetamide and N-isopropyl diethoxyphosphonoacetamide in place of diethoxyphosphonoacetamide, the respective N,N-dimethyl amides and N-isopropyl amides of Formula B are prepared.

By repeating the procedure of this example using 2-(tetrahydropyran-2'-yloxy)-acetonitrile in place of the butyronitrile, there is obtained as the final product, 4-hydroxy-3-(4',4',8',8'-tetramethylnonan-1'-yl)crotonic acid γ-lactone.

What is claimed is:
1. A compound selected from those having the Formula A:

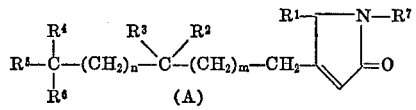
(A)

wherein, $m$ is zero or the positive integer one to five;
$n$ is the positive integer two to six;
each of $R^1$, $R^2$, $R^6$ and $R^7$ is hydrogen or lower alkyl; and each of $R^3$, $R^4$ and $R^5$ is lower alkyl.

2. A compound according to claim 1 in which $R^7$ is hydrogen, methyl or ethyl; $m$ is one to three and $n$ is one to four; each of $R^1$ and $R^2$ is hydrogen, methyl or ethyl; and each of $R^3$, $R^4$, $R^5$ and $R^6$ is methyl or ethyl.

3. A compound according to claim 2 in which $R^1$ is methyl and $R^7$ is hydrogen.

4. A compound according to claim 1 in which $m$ is one or two; $n$ is two to four; each of $R^1$, $R^2$ and $R^7$ is hydrogen, methyl or ethyl; and each of $R^3$, $R^4$, $R^5$ and $R^6$ is methyl or ethyl.

5. A compound according to claim 4 in which $R^1$ is methyl and $R^7$ is hydrogen.

6. A compound according to claim 1 in which $m$ is one or two and $n$ is two to four.

7. A compound according to claim 6 wherein $R^1$ is hydrogen or methyl; each of $R^2$ and $R^6$ is hydrogen; each of $R^3$, $R^4$ and $R^5$ is methyl or ethyl and $R^7$ is hydrogen, methyl or ethyl.

8. A compound according to claim 7 wherein each of $R^3$, $R^4$ and $R^5$ is methyl; $n$ is three and $m$ is one.

9. A compound according to claim 1 wherein $m$ is two; $n$ is three; $R^2$ is hydrogen; $R^1$ is hydrogen or methyl; $R^7$ is hydrogen, methyl or ethyl and each of $R^3$, $R^4$, $R^5$ and $R^6$ is methyl or ethyl.

10. A compound according to claim 9 wherein $R^6$ is hydrogen.

11. A compound according to claim 10 wherein each of $R^3$, $R^4$ and $R^5$ is methyl.

12. A compound according to claim 1 wherein each of $R^2$ and $R^6$ is hydrogen; each of $R^3$, $R^4$ and $R^5$ is methyl; $m$ is zero; $n$ is two; $R^1$ is hydrogen or methyl and $R^7$ is hydrogen, methyl or ethyl.

References Cited
UNITED STATES PATENTS
3,272,842  9/1966  Easton et al. ........ 260—326.5

JOSEPH A. NARCAVAGE, Primary Examiner

U.S. Cl. X.R.

260—345.7, 347.3, 561 N; 424—274, 285, 320